United States Patent [19]

Tsuyoshi et al.

[11] Patent Number: 4,710,909

[45] Date of Patent: Dec. 1, 1987

[54] PHASE COMPENSATION APPARATUS FOR AN OPTICAL INFORMATION RECORDING AND REPRODUCING SYSTEM

[75] Inventors: Toshiaki Tsuyoshi, Kokubunji; Seiji Yonezawa; Masuo Kasai, both of Hachiouji; Motoo Uno, Niihari, all of Japan

[73] Assignee: Hitachi, Ltd., Tokyo, Japan

[21] Appl. No.: 692,575

[22] Filed: Jan. 18, 1985

[30] Foreign Application Priority Data

Jan. 20, 1984 [JP] Japan .................................. 59-7123

[51] Int. Cl.⁴ .............................................. G11B 7/00
[52] U.S. Cl. ........................................ 369/46; 369/49
[58] Field of Search ................. 369/44, 45, 46, 47, 369/48, 109, 50, 59; 358/342

[56] References Cited

U.S. PATENT DOCUMENTS

| | | | |
|---|---|---|---|
| 4,106,058 | 8/1978 | Romeas et al. | 358/342 |
| 4,138,663 | 2/1979 | Lehureau et al. | 369/44 |
| 4,363,116 | 12/1982 | Kleuters | 369/32 |
| 4,443,870 | 4/1984 | Hazel et al. | 369/44 |
| 4,467,462 | 8/1984 | Shibata | 369/45 |
| 4,476,555 | 10/1984 | Joichi et al. | 369/44 |
| 4,530,079 | 7/1985 | Millar | 369/44 |
| 4,544,838 | 10/1985 | Musha et al. | 369/44 |
| 4,544,872 | 10/1985 | Hirano et al. | 369/44 |
| 4,553,228 | 11/1985 | Gerard et al. | 369/46 |
| 4,562,564 | 12/1985 | Bricot et al. | 369/44 |
| 4,564,929 | 1/1986 | Yonezawa et al. | 369/44 |
| 4,581,728 | 4/1986 | Nakamura et al. | 369/46 |
| 4,583,208 | 4/1986 | Verboom | 369/44 |

Primary Examiner—Donald McElheny, Jr.
Attorney, Agent, or Firm—Antonelli, Terry & Wands

[57] ABSTRACT

An optical system for recording and reproducing optical information. A line of synchronization pits for tracking and an information recording area are disposed alternately in advance. At the time of recording, a tracking signal is detected from the line of synchronization pits and while tracking in the information recording area by utilizing this signal, the information signal is recorded in the information recording area. Tracking control in tracking in the information recording area is stabilized by holding the tracking signal which is detected from the synchronization signal and by compensating for an electrical phase delay caused by the holding.

9 Claims, 17 Drawing Figures

PHASE COMPENSATION APPARATUS FOR AN OPTICAL INFORMATION RECORDING AND REPRODUCING SYSTEM

BACKGROUND OF THE INVENTION

This invention relates to an information recording and reproducing system using a recording medium which is capable of recording and reproducing an information signal such as an optical disk, and more particularly, it relates to an information recording and reproducing system which enables a secure tracking at the time of recording and reproducing the signal.

Referring to FIG. 1A, the referential numeral 1 represents a drive circuit of a semiconductor laser 2. FIG. 1B is a graph explaining the principle of operation of the semiconductor laser. The semiconductor laser 2 can modulate the output level (the ordinate in FIG. 1B) of laser light quantity directly from $y_1$ to $y_2$ by the pulse modulation from $x_1$ to $x_2$ of the level of drive current (the abscissa in FIG. 1B) which corresponds to a reproduction drive signal 3 or a record drive signal 4 which is introduced to the drive circuit 1. At the time of reproduction, the laser 2 is operated with a laser light quantity output $y_1$ and, at the time of recording with a laser light quantity output $y_2$.

A method for recording information will be first described. The light modulated by an information signal as described above and emitted from the laser 2 becomes a beam 11 which has been caused to converge by a coupling lens 5, a polarizing beam splitter 6, a galvanomirror 7, a quarter wave plate 8 and an objective lens 9, and on a disk 10, which is irradiated by the laser beam, an information signal consisting of pits is recorded.

A method for reproducing the information signal recorded in this way will next be explained. When the laser beam, the output level of laser light quantity of which has been decreased as described above, is caused to irradiate pits (not shown) which are formed on a track 12, the pits diffract the beam and the diffracted reflected beam returns to a photodetector 13 through the above optical system. At this time, due to the polarization effect of the quarter wave plate 8, it is reflected by the polarizing beam splitter 6, detected by the photodetector 13 and converted to an electrical signal so that it may be taken out as an output 13'.

FIG. 2 shows an example of the structure of a track which has hitherto been used for such an optical disk apparatus capable of recording and reproducing. In the track 12, a header area 121 and an information recording area 122 are disposed alternately, and in the header area 121 a track address, a sector address, a synchronization signal and the like are recorded in advance with the pits $\lambda/4$ deep. In the header area 121 and the information recording area 122 a track groove $\lambda/8$ deep is formed in advance and the data pits are recorded on this track groove. If a light beam deviates from the center of the groove of the track 12, the diffracted beam pattern on the photo detector in FIG. 1A becomes asymmetric by virtue of the edges of the track groove. Therefore, in this kind of optical disk apparatus, as is shown in FIG. 8, the diffracted beam from a track groove is received by two photodetectors 131, 132 arranged in parallel with the track groove, and a tracking signal is detected by differentiating the outputs of these two detectors. This kind of apparatus has been disclosed in the Japanese patent application Laid-Open No. 60702/74.

In the $\lambda/8$ deep track type tracking method described above, however, when a light beam is moved by, for example, a galvanomirror for conducting tracking control, a tracking signal offset is produced on a tracking signal. Further, when the disk is not tilted, the comma aberration is produced, which disturbs, particularly, the balance of the two photodetectors which are arranged in parallel with the track and increases the probability of a tracking signal offset, thus disadvantageously making normal tracking impossible.

In addition, when the information recorded with high density in a DC groove is reproduced, tracking sensitivity is lowered, which unfavorably increases the tracking offset. Furthermore, in the conventional $\lambda/8$ deep DC groove tracking method, the tracking signal inconveniently lacks stability because of the difference of reflectivity, evenness and refractive index of the disk which are inevitable due to the properties of the recording materials, and therefore, there are limitations in the degree of high-density recording possible.

SUMMARY OF THE INVENTION

Accordingly it is an object of the invention to eliminate the above problems in the prior art, and to provide an optical information recording and reproducing system which enables a stable tracking control, and hence, stable information recording and reproduction irrespective of the material used for the disk recording means.

There is a system which achieves this end. In this system an area which has a line of synchronization pits for tracking and an information recording area are provided alternately in a disk in advance and, at the time of recording information, a tracking signal is detected from the line of synchronization pits and while tracking in the information recording area by utilizing this signal, the information signal is recorded in the information recording area. (See U.S. Pat. No. 443,871. INFORMATION RECORDING AND REPRODUCING APPARATUS, filed on Nov. 23, 1982). This invention, in particular, stabilizes tracking control in tracking in the information recording area, by holding a tracking signal which is detected from the synchronization signal and by compensating for an electrical phase delay.

It is another supplementary object of the invention to enable stable tracking by providing a track groove for access only in the information recording area such as to enable random access.

BRIEF DESCRIPTION OF THE DRAWING

FIG. 1 B explains a principle of operation for modulating and driving a semiconductor laser;

DETAILED DESCRIPTION OF THE PREFERRED EMBODIMENT

Figure 3:
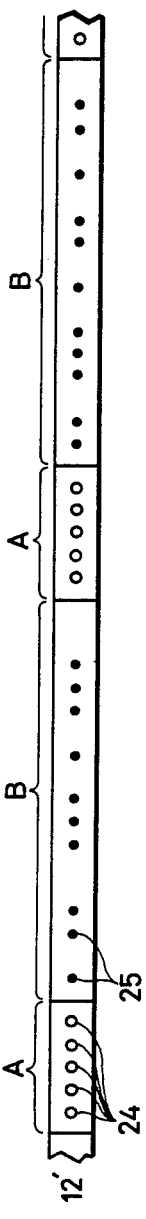
FIG. 3 explains the structure of the track of an optical disk for a recording and reproducing system according to the invention.

Hereinunder, embodiments of the invention will be described with reference to the accompanying drawings. FIG. 3 shows an embodiment of a track of an optical disk according to the invention. A track 12' is composed of repetitions of two kinds of areas A and B. The area A is composed of a line of synchronization pits 24, and the area B is an information recording area for recording information or data pits 25. In the area A, a line of prepits such as a synchronization signal for phase lock and an address signal may be recorded in advance. In this system according to the invention, synchronization pits and information or data pits may have either an amplitude structure or a phase structure.

Operation at the time of recording and reproducing in a system of such construction is as follows.

In the data recording mode, tracking control is conducted by a tracking signal obtained by the method which will be described later when a light beam passes through the area A, and when it passes through the area B, the tracking signal is held by the method which will be described later and modulated in accordance with the recording information signal, whereby information pits are recorded in accordance with said signal. The timing signal at the time of recording the information is obtained from the line of synchronization prepits in the area A, and the information pits 25 are correctly recorded in the information recording area in the area B.

In the data reproducing mode, a timing pulse 26 and the initial point of the information recording area are obtained from the line of synchronization pits. The initial point can be used to distinguish between the line of synchronization pits and line of information pits and to reproduce the data.

Next, a method for obtaining a tracking signal from the line of synchronization pits in this system will be explained.

Figure 1A:
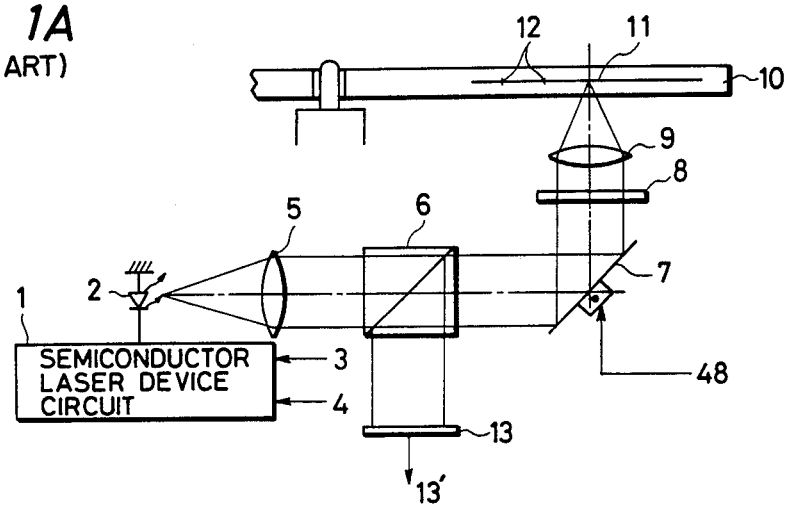
FIG. 1 A shows an optical system for recording and reproducing an information signal onto an optical disk.
Figure 1B:
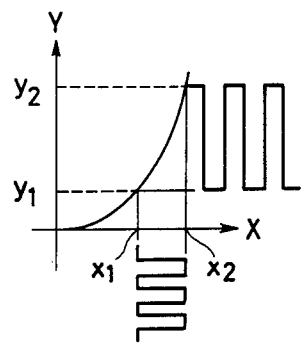
Figure 2:
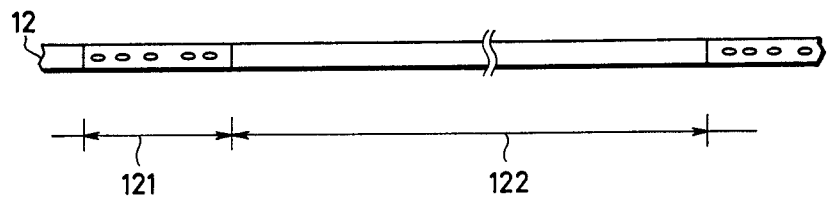
FIG. 2 explains the structure of the track of a conventional optical disk for a general recording and reproducing system.
Figure 4:
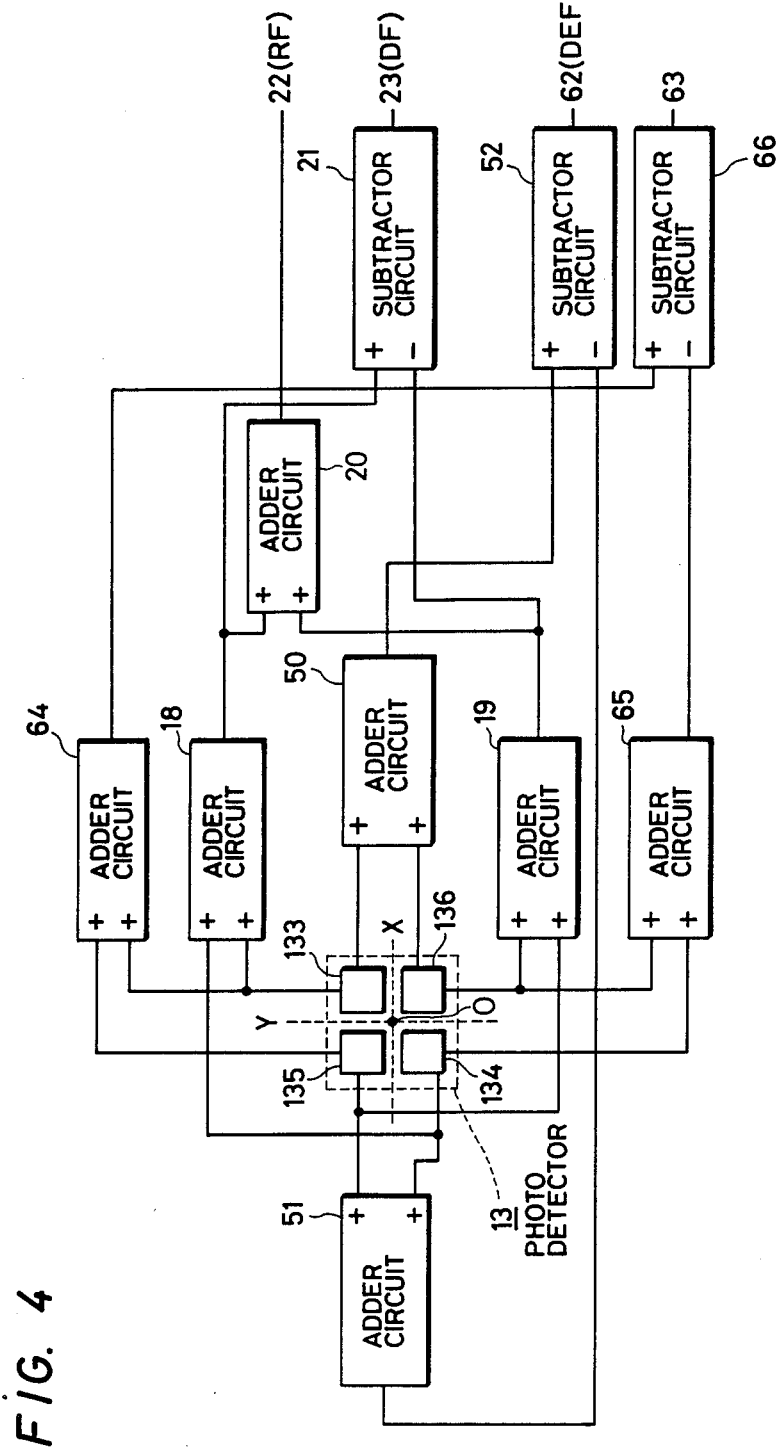
FIG. 4 is a block diagram explaining the structure of a photodetector for obtaining a tracking signal from a line of synchronization pits according to the invention.

In the embodiment of the invention, as is shown in FIG. 4, a four-division type photodetector (133, 134, 135, 136) is used as the photodetector 13 shown in FIG. 1A. In FIG. 4, the center 0 of the photodetector agrees with the optical axis of the optical system (FIG. 1 A), and the X - axis is set in a direction parallel with the track and the Y - axis is set in a direction transverse to the track. Output signals $I_{133}$, $I_{135}$, $I_{134}$, $I_{136}$ are taken out from the photodetectors 133, 135, 134, 136, respectively, which are provided in the first, second, third and fourth quadrants, respectively. A DF signal which satisfies the following condition is formed in adder circuits 18, 19 and a subtractor circuit 21:

$$DF=(I_{133}+I_{134})-(I_{135}+I_{136}),$$

and an RF signal which satisfies the following condition is formed in the adder circuits 18, 19, 20:

$$RF=(I_{133}+I_{134})+(I_{135}+I_{136}).$$

Further, a difference signal DEF which satisfies the following condition is formed in adder circuits 50, 51 and a subtractor circuit 52:

$$DEF=(I_{133}+I_{136})-(I_{134}+I_{135}).$$

Figure 5:
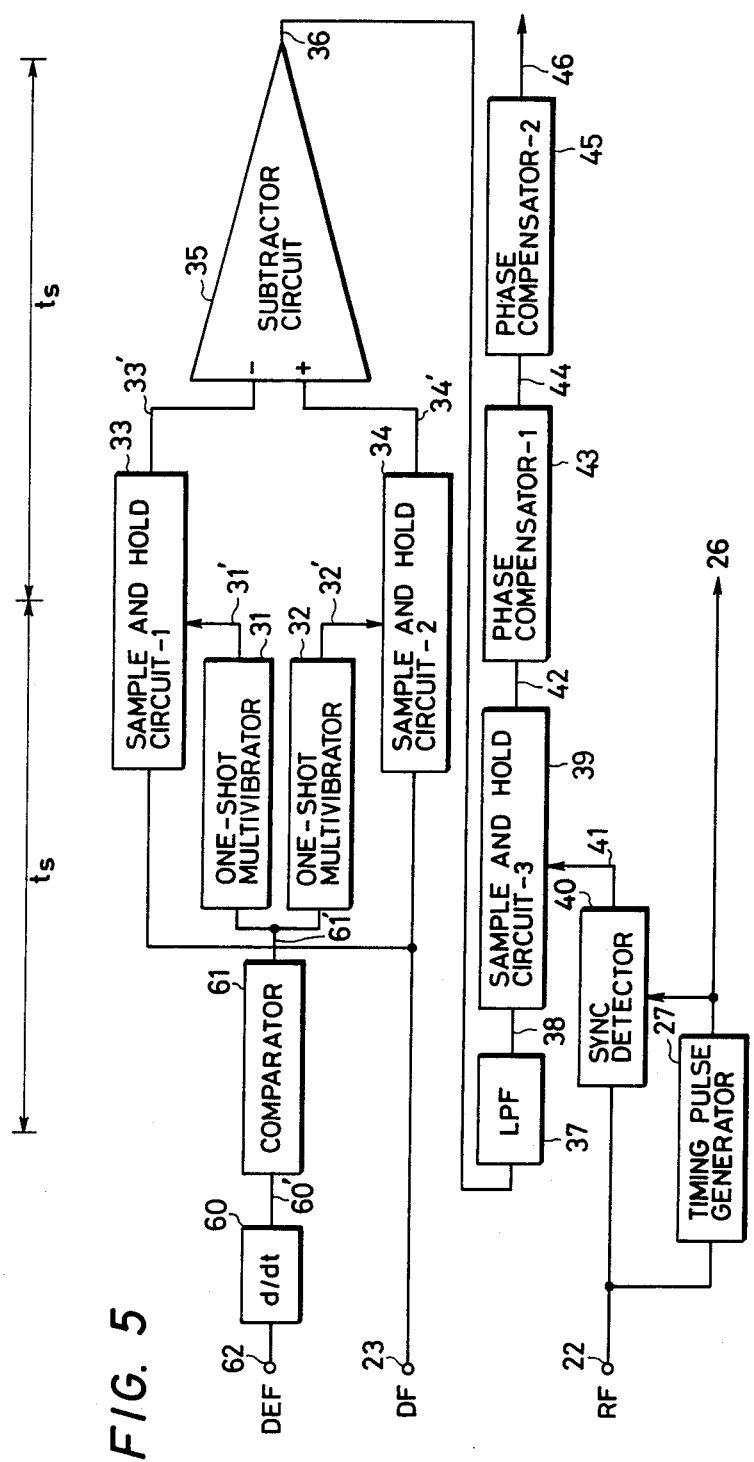
FIG. 5 explains a tracking servosystem for sampling tracking according to the invention.

By supplying the RF signal, the DEF signal and the DF signal obtained in this way to the circuits shown in FIG. 5, a desired tracking signal 36 is obtained.

Figure 6:
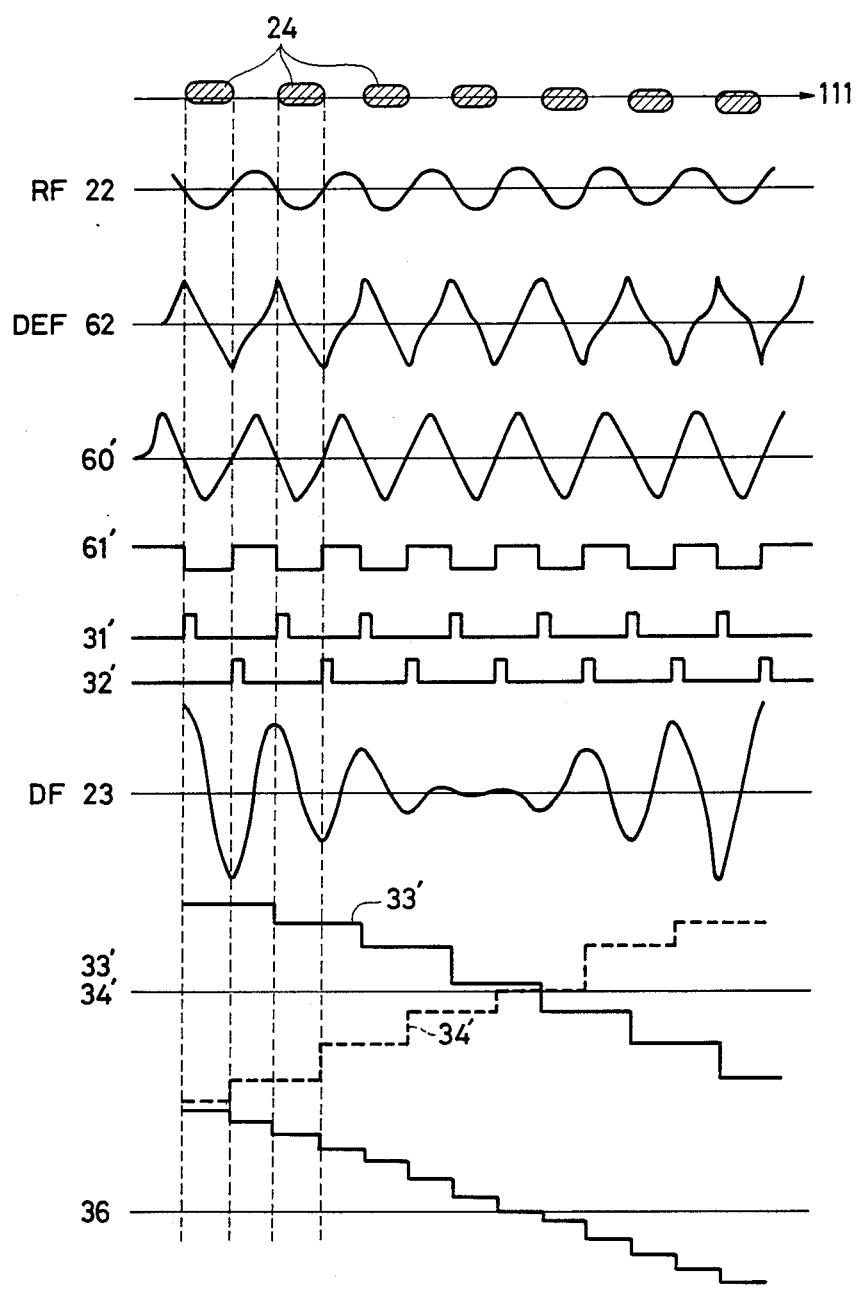
FIG. 6 shows the waveforms of the signal outputs from each circuit for obtaining a tracking signal from the line of synchronization pits.

FIG. 6 is a chart explaining the operation and shows the output waveforms in each area in FIG. 5.

A laser beam 11 such as shown in FIG. 1A irradiates while successively crossing the track 12' composed of the pits 24 as is shown in FIG. 3 in the direction of a trajectory 111 shown in FIG. 6, there being a time interval between each pass of the laser beam 11. In this case, the waveforms of the sum of the signals generated from the four-division photodetector 133, 134, 135, 136, namely, $RF=(I_{133}+I_{134})+(I_{135}+I_{136})$, the difference signal $DEF=(I_{133}+I_{136})-(I_{134}+I_{135})$, and the difference signal $DF=(I_{133}+I_{134})-(I_{135}+I_{136})$, are as is shown in FIG. 6. The level of signal quantity of the RF signal 22 is lowered in the synchronization pits 24 due to diffraction. Therefore, the DEF signal 62 has peaks at both ends of the synchronization pits 24, and its waveform resembles the form of the differentiated RF signal. Thus, by inputting the DEF signal into a differentiation circuit 60, as is shown in FIG. 5, to obtain an output signal 60', and by inputting this output signal 60' into a zero crossing detector circuit (comparator) 61 a signal 61' is obtained which separates the pit area from the non-pit area. Further, by using one-shot multivibrators 31, 32, the position of the edges at both ends of the pits can be detected from the signal 61' through the positions of pulse signals 31' and 32'.

On the other hand, as is clear from the trajectory of the laser beam irradiating each pit which is shown in the upper part of FIG. 6, tracking deviation of the beam is generated; that is, the position which the beam irradiates is different depending on each pit, for example, the beam irradiates the lower part of the leftmost pit, the central part of the center pit and the upper part of the rightmost pit. Accordingly, in the signal DF 23, as is shown in FIG. 6, the value is zero in the center of a pit at the center between two pits and at both edges of a pit it takes the peak values of opposite polarities. The absolute quantity of the peak value is proportional to the amount of the tracking deviation of the beam 11, and the polarity of the DF signal before or after a pit denotes the direction of the tracking deviation. Therefore, as is shown in FIG. 5, by sampling and holding the DF signal 23 at the edges before and after a pit in sample and hold circuits 33, 34, tracking error signals 33' and 34', the phases of which are mirror images of each other are obtained.

The tracking error signal 33' or 34' can be used as a tracking signal, but here in order to obtain a tracking signal in which the signal to noise ratio S/N is increased, a difference is made between the signal 33' and the signal 34' in a subtractor circuit 35, in order to obtain a more stable tracking signal 36.

By operating the galvanomirror 7 by this tracking signal 36, the tracking deviation can be corrected. This tracking error detection system is a kind of synchronous detection, and is hardly influenced at all by an offset signal caused by a disk being tilted. Further, since a tracking signal is detected at both edges of a pit, as described above, this tracking error detection system dispenses with the need for a DC track groove as is required in the prior art.

Next will be explained an information recording and reproducing system in which a data signal is recorded by obtaining a tracking signal in the area A of a track such as that shown in FIG. 3 by using this tracking system and holding the tracking information in the area B.

In the track 12' of a construction such as is shown in FIG. 3, no track information is obtained before the data pits 25 are recorded because pits are not recorded in the information recording area (area B). Sometimes the tracking signal is disturbed by the reflected beam of writing pulses of large light quantity in writing the data pits 25 in the information recording area. To prevent this, it is better, in the area B, to hold the tracking signal obtained in the area A immediately before the area B and to conduct tracking by utilizing this signal at the time of writing.

Figure 7:
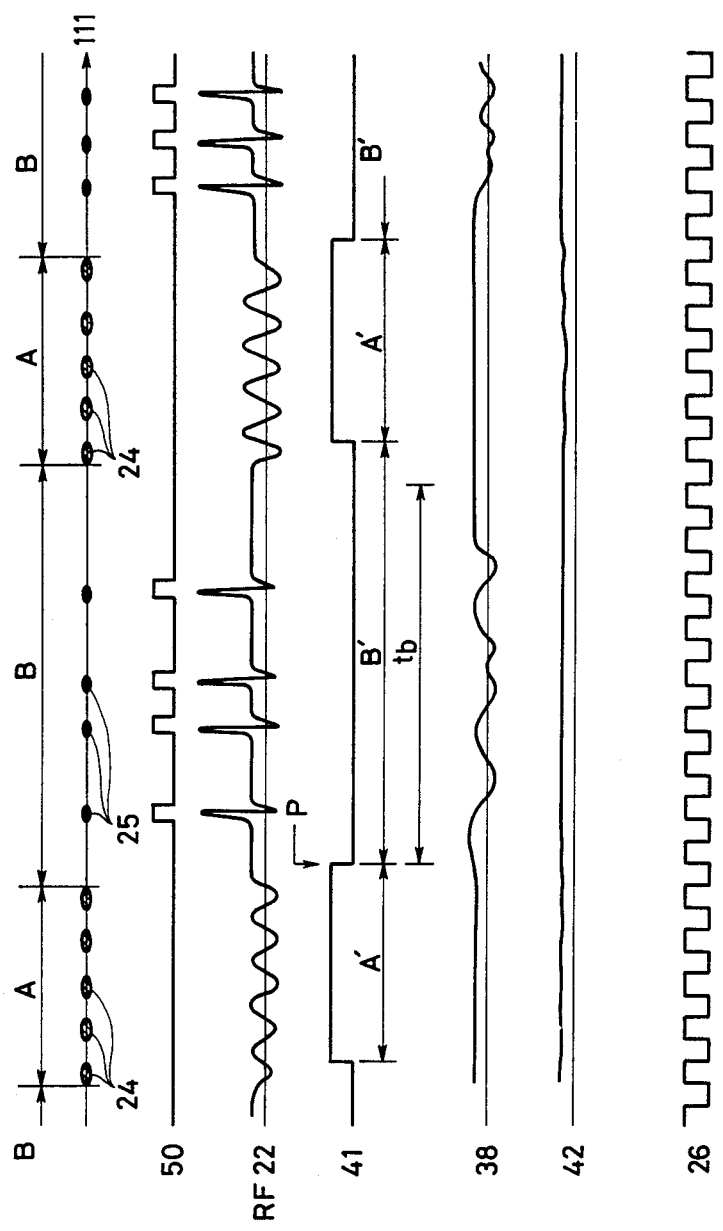
FIG. 7 is a time chart of each signal at the time of obtaining a tracking signal from the line of synchronization pits and writing data in the information recording area while holding the tracking signal.

FIG. 7 is a time chart of each signal when a tracking signal obtained in the line of synchronization pits and data are written in the information recording area while holding the tracking signal. The uppermost portion shows the structure of the track, the numeral 24 represents synchronization pits, 111 the trajectory of the light beam and 25 the data pits which have been recorded by writing pulses. The tracking signal 36 shown in FIG. 6 is passed through a low-pass filter 37, as is shown in FIG. 5, such as to remove noises beyond the tracking control frequency range and obtain a signal 38.

From the RF signal 22, as shown in FIG. 5, a discrimination signal 41 which distinguishes a synchronization prepit area A' from an information recording area B' shown in FIG. 7 is obtained in a sync detector 40. A method of discrimination used in the sync detector 40 is, for example, decoding the previously appropriately coded patterns of the synchronization pits. A simpler method is to process a signal obtained by making constant the pitch intervals of a line of synchronization pits with constant intervals by a retriggerable one-shot multi-vibrator.

The signal 38 which has passed through the low-pass filter 37, as is shown in FIG. 5, is input into a sample and hold circuit 39, which is controlled by the discrimination signal 41 in the following way:

In the synchronization prepit area A' of the discrimination signal 41 shown in FIG. 7, the signal is passed through the sample and hold circuit 39 and in the information recording area B', a tracking signal in the last portion of the area A' is held in the sample and hold circuit 39. As is shown in FIG. 7, the discrimination signal 41 keeps the holding state for the minimum time $t_b$ necessary for the light beam to pass the information recording area B' from the point P where the discrimination signal 41 has finished detecting the synchronization pit area A', whether or not the RF signal is input, and inhibits resuming the sampling state within the time $t_b$.

The point P is the initial point in writing data.

A train of writing timing pulses 26 shown in FIG. 7 is obtained by inputting the RF signal 22 of a line of synchronization pits into a timing generation circuit 27 using phase locked loop (PLL) or the like, as is shown in FIG. 5.

A signal 42 in FIG. 7 is a tracking signal used when the data pits 25 are recorded in the information recording area B while the discrimination signal 41 is sampling and holding the tracking signal 38. When not on hold, the tracking signal 38 is sometimes disturbed by writing pulses 50, but the discrimination signal 41 can prevent this phenomenon by holding a tracking signal in the information recording area B.

The conditions for applying this system according to the invention in relation to tracking control will be described in the following.

Figure 8:
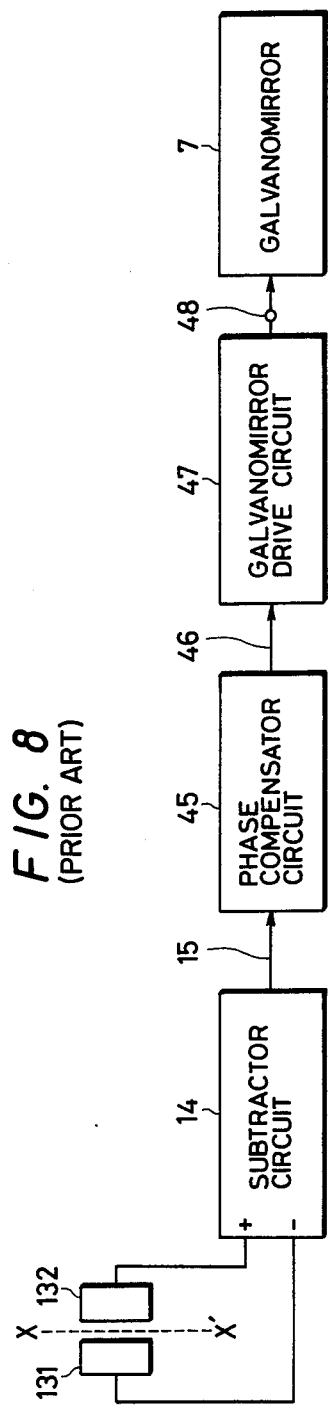
FIG. 8 is a block diagram explaining the structure of a continuous tracking servosystem for a conventional optical disk.

For a better understanding, the conventional track groove type continuous tracking servosystem will first be explained. FIG. 8 is a block diagram of the conventional track groove type tracking servosystem. Two photodetectors 131, 132 which are arranged in the direction parallel to a track groove (X - X') receive the diffracted beam from the track groove and a tracking signal 15 is obtained by detecting the difference in the outputs between the two photodetectors in a subtractor circuit 14. The tracking signal 15 is amplified in a galvanomirror drive circuit 47 through a phase compensator 45 for obtaining a phase margin to increase the stability of the servosystem and is then input into a galvanomirror 7. In other words, the light beam is controlled such as to trace the center of the track by orientating the direction of the galvanomirror 7 in accordance with the tracking signal 15.

Figure 9:
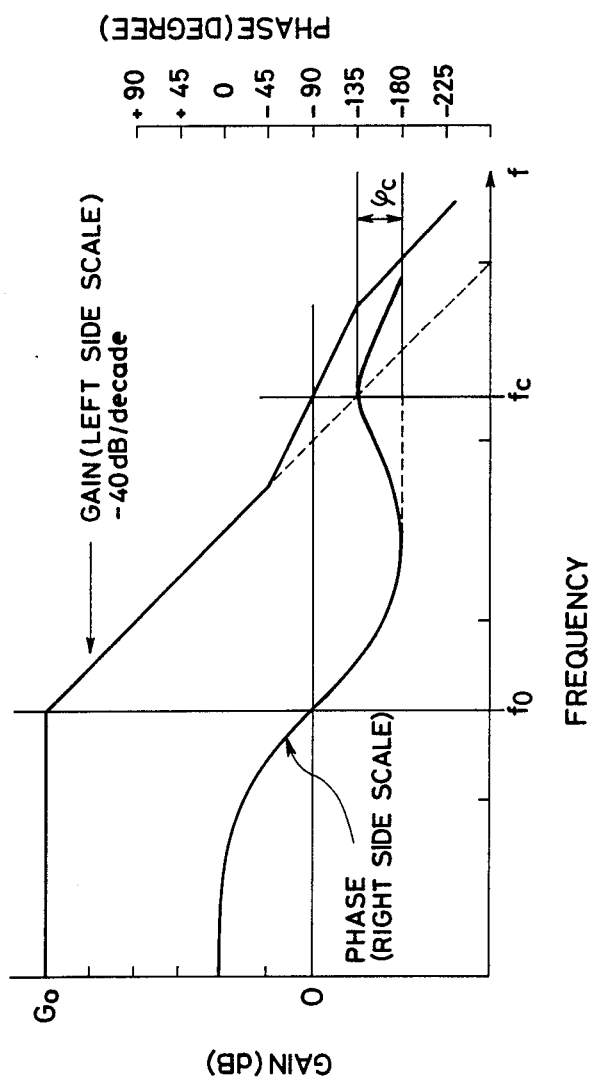
FIG. 9 is a Bode Diagram explaining frequency characteristics of the conventional continuous servosystem.

FIG. 9 is an example of a Bode diagram showing the open-loop characteristics (solid line) of a track groove type continuous tracking servosystem such as is shown in FIG. 8. The abscissa represents frequency and the left side scale of the loop gain and the right side scale thereof phase. Generally, in the tracking of an optical disk, about 60 dB of DC gain $G_o$ and about not less than 45° of phase margin $\phi_c$ are required. Here the DC gain represents the ratio of value of the deviation (e.g. about 100 μm) to value of the tracking error (e.g. about 0.1 μm) which still remain under nomal control of the disk, and it can be said that the larger $G_o$ is, the efficiency of the servosystem is higher. The phase margin $\phi_c$ represents the margin tolerable before the phase reaches $-180°$ at the frequency where the gain of the servosystem is 1 (0 dB) (at the gain crossover frequency: fc), and the larger $\phi_c$ is, the more secure the servosystem is. If $\phi_c$ is small, the servosystem oscillates, which makes correct control impossible.

The phase compensator 45 shown in FIG. 8 will now be explained. The characteristics indicated by the extended broken lines in FIG. 9 represent the frequency characteristic of the galvanomirror. In this case, the gain is constant in the area where the frequency is lower than resonance frequency ($f_0$) but in the area where the frequency is higher than $f_0'$ the gain decreases at the rate of $-40$ dB/dacade, namely when the frequency is 10 times higher, the gain decreases by 1/100. Therefore, when 60 or more dB of DC gain is necessary, the gain crossover frequency ($f_c$) becomes more than 30 times the frequency of $f_0$. On the other hand, the phase margin approaches 0° on the lower side in relation to $f_0$ and it approaches $-180°$ on the higher side; Therefore, in regard to the characteristics of a galvanomirror which has no compensator, the phase is about $-180°$ in the neighborhood of $f_c$ where the frequency is approximately 30 times and the phase margin $\phi_c$ is approximately zero, which tends to cause the servosystem to oscillate. To prevent this, a phase compensator (phase lead compensator) 45 is utilized in order to shift the phase upward in terms of FIG. 9 into the vicinity of $f_c$ and to provide adequate $\phi_c$, thereby heightening stability. The characteristics after the phase compensator has been added are indicated by the solid lines in FIG. 9. Since the phase lead compensator is a kind of high-pass filter, by taking a phase margin the gain in the vicinity of $f_c$ is also heightened. The above are the characteristics of the conventional servosystem in the case of tracking while continuously obtaining tracking signals from a track groove.

Hereinunder the difference between the tracking servosystem according to the invention and the conventional one will be described.

Figure 10:
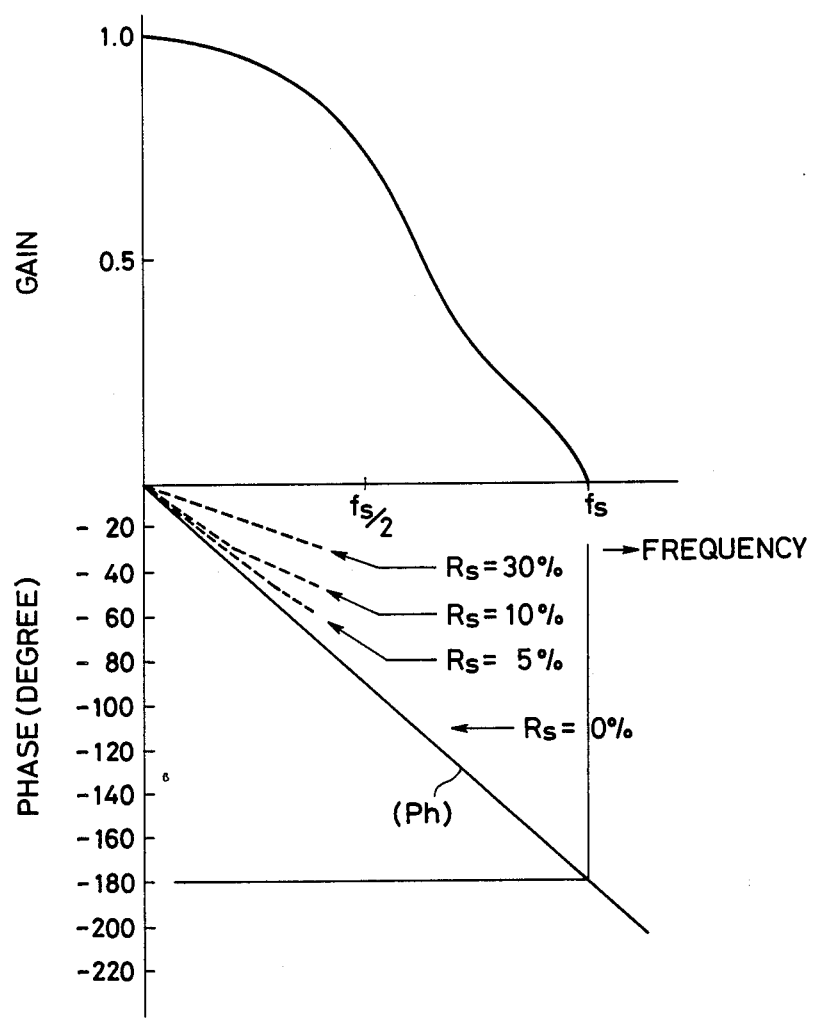
FIG. 10 is a graph explaining phase delay caused when a tracking signal is obtained only in the lines of synchronization pits.

In the tracking system according to the invention, tracking information is obtained in the synchronization prepit area in the area A, and in the information recording area the tracking information is put on hold, i.e. the servosystem is one which incorporates a hold circuit. The transfer function $G_h(jw)$ of the hold circuit when the zero-order hold is conducted at a sampling frequency of $f_s$ is $$G_h(jw) = \frac{1 - e^{-jwT_s}}{jwT_s} \quad (1)$$

$$(T_s = 1/f_s)$$

and the gain and phase characteristics thereof are indicated by the solid line ($P_h$) in FIG. 10. The ordinate and the abscissa of FIG. 10 are linear scales and it is clear that the transfer characteristic of the hold circuit has a factor leading to a phase delay in the same way as a low-pass filter does. The sample time is infinitesimal in formula (1), but in the system according to the invention the sample time, namely the time required for the light beam to pass a line of synchronization pits, is finite, and, therefore, the characteristics are a little different. The broken lines in FIG. 10 show the sampling ratio $R_s$, represented as a parameter, namely the ratio between a sampling time (the time required for passing the area A) and a sampling period (the total time required for passing the area A and the area B). The higher the sampling ratio is higher, the smaller the phase delay becomes, but when the sampling ratio is not greater than 5%, the phase delay is approximately the same as in the case of an infinitesimal sampling time.

Accordingly, when a tracking signal is obtained only in the line of synchronization pits and the signal is held in the information recording area, phase delay is caused in the sample and hold circuit, which involves the risk of impairing the stability of the servosystem.

Further, when a tracking signal contains frequency components higher than $f_s/2$, it is necessary to insert a low-pass filter 37 as is shown in FIG. 5 as a band-rejection filter in the stage previous to the sample and hold circuit 39 in order to remove these high frequency components. The low-pass filter is generally a phase delay circuit, which may also be a main cause of the stability of the servosystem deteriorating.

In order to solve the above problems, the sampling frequency should be adequately high, for example, by increasing the speed of rotations of the disk or the number of sectors (a unit consisting of the area A and the area B in FIG. 3) provided in terms of the entire length of the track. However, as described above, in an optical disk generally, since DC gain as high as more than 60 dB is required in the tracking servosystem, the gain crossover frequency $f_c$ itself is as high as approximately 2 kHz. Therefore, if the sampling frequency $f_s$ is made sufficiently high, for example, 50 times $f_c$, $f_s$ should be 100 kHz. In this case, even if the number of the sectors in the track were 1,000, the disk should be rotated at an extremely high speed of as much as 100 Hz (6,000 rpm). Nevertheless, there are limitations to the acceptable speed of rotation of a disk from the viewpoint of mechanical strength. On the other hand, the extreme increase in the number of sectors fractionates the data to be recorded and thus lowers the efficiency in processing data. Accordingly, this method of making the sampling frequency adequately high has its limitations.

Accordingly, in this invention, it is intended to realize a secure tracking servosystem without the need for a very high sampling frequency even in a tracking system in which a tracking signal is obtained by an intermittent sampling and holding.

To this end, a phase compensator (phase lead compensator) 43 shown in FIG. 5 is used which satisfies the following relation in the vicinity of $F_c$:

$$G(jw) \cdot G_{LPF}(jw) \cdot G_h(jw) \cdot G_c(jw) \approx G(jw)$$

namely, $$G_c(jw) \approx \{G_{LPF}(jw) \cdot G_h(jw)\}^{-1}$$

wherein, $G(jw)$ represents the frequency transfer function of a general continuous tracking control system such as is shown in FIG. 9, and $G_{LPF}(jw)$ and $G_h(jw)$ the frequency transfer functions of the low-pass filter 37 and the sample and hold circuit 39, respectively, in FIG. 5. Since the higher the sampling frequency $f_s$ is compared to $f_c$, the smaller becomes the phase delay of $G(jw)$ in the vicinity of $f_c$, $G_c(jw)$ is more easily realized. It is preferable in practical use that $f_s > 5f_c$.

Figure 11:
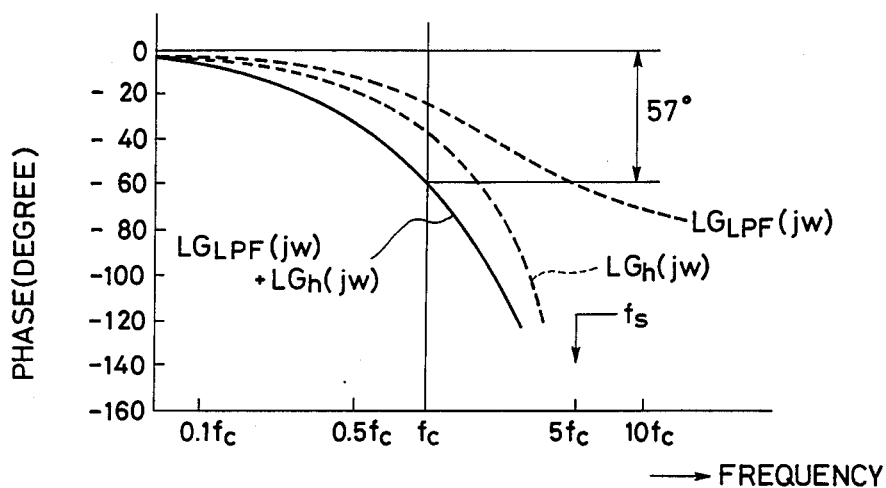
FIG. 11 explains a phase delay characteristic caused by a sampling element and a low-pass filter.
Figure 12:
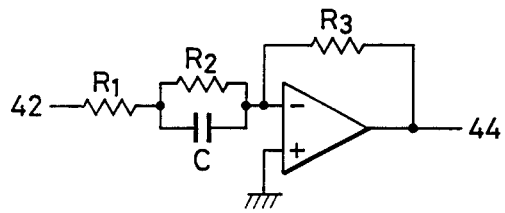
FIG. 12 shows an example of a compensator for compensating for the phase delay.

In FIG. 11, $<G_{LPF}(jw)$, $<G_h(jw)$ and $<G_{LPF}(jw)+<G_h(jw)$ show the phase characteristics of $G_{LPF}(jw)$, $G_h(jw)$ and $G_{LPF}(jw) \cdot G_h(jw)$, respectively, where $G_{LPF}(jw)$ is the frequency transfer function of a first order low-pass filter the cut-off frequency of which is 2.5 $f_c$ and $G_h(jw)$ is the frequency transfer function of a sample and hold circuit in which $f_s = 5f_c$. As is shown in FIG. 11, in the synthesized characteristic of $G_{LPF}(jw)$ and $G_h(jw)$, $<G_{LPF}(jw)+<G_h(jw)$, the phase is delayed about 57° at $f_c$. Therefore, the phase compensator 43 shown in FIG. 5 should have a characteristic of gaining the phase to the extent of about 60° at $f_c$. For example, a phase lead compensator shown in FIG. 12 using an operational amplifier can be used.

Figure 13:
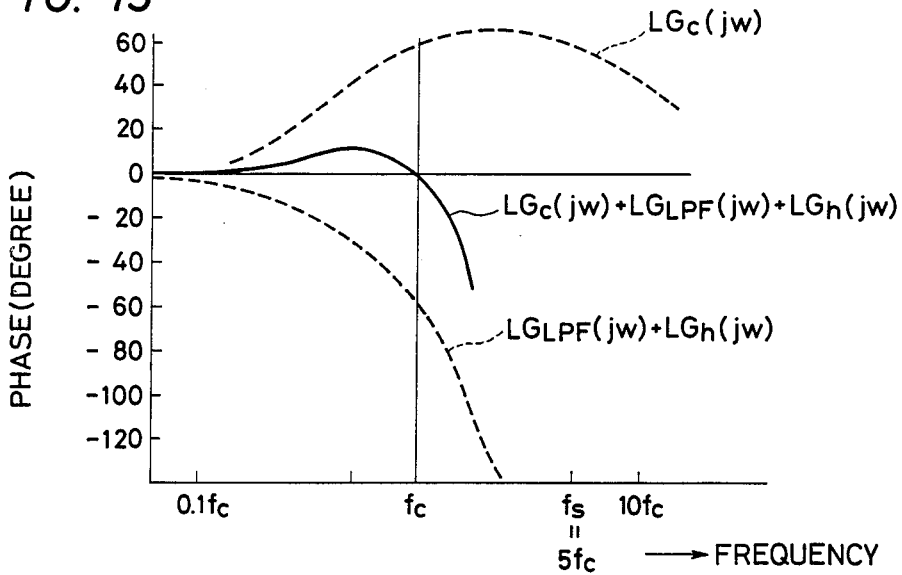
FIG. 13 shows a phase characteristic when the phase delay caused by sampling is compensated.

Under the approximate conditions that $R_3 = R_1 + R_2$, $C = \frac{1}{3}\pi f_c R_2$ and $R_3 = 20R_2$, the phase lead angle of about 60° is obtained. FIG. 13 shows the phase characteristic $<G_{LPF}(jw)+<G_h(jw)$ by a hold circuit and the low-pass filter 37 shown in FIG. 13, the phase characteriistic $<G_c(jw)$ of the frequency transfer function $G_c(jw)$ of the phase compensator 43 in FIG. 5 for correcting the phase delay caused by these elements and the phase characteristic $<G_{LPF}(jw)+<G_h(jw)+<G_c(jw)$ when a hold compensation is conducted with the hold circuit, low-pass filter and the phase compensator added. It is clear that by adding the phase compensator $G_c(jw)$, the phase delay in the vicinity of $f_c$ caused by the hold circuit and the low-pass filter is almost cancelled. For this reason, and the phase compensator 43 is incorporated in the block diagram in FIG. 5 as a factor $G_c(jw)$, for the purpose of compensating for the phase delay of the low-pass filter 37 and the sample and hold circuit 39. The phase compensator 45 is used for the same reason as the phase compensator in the continuous servosystem in FIG. 8, but one compensator may be sufficient to serve as both compensators depending on the circumstances.

Even in the case of holding a tracking signal at every sector as in the present invention, it is possible to realize a servosystem which has an efficiency approximately equal to a continuous tracking system by adding an element for cancelling the phase delay caused by a hold circuit.

Figure 14:
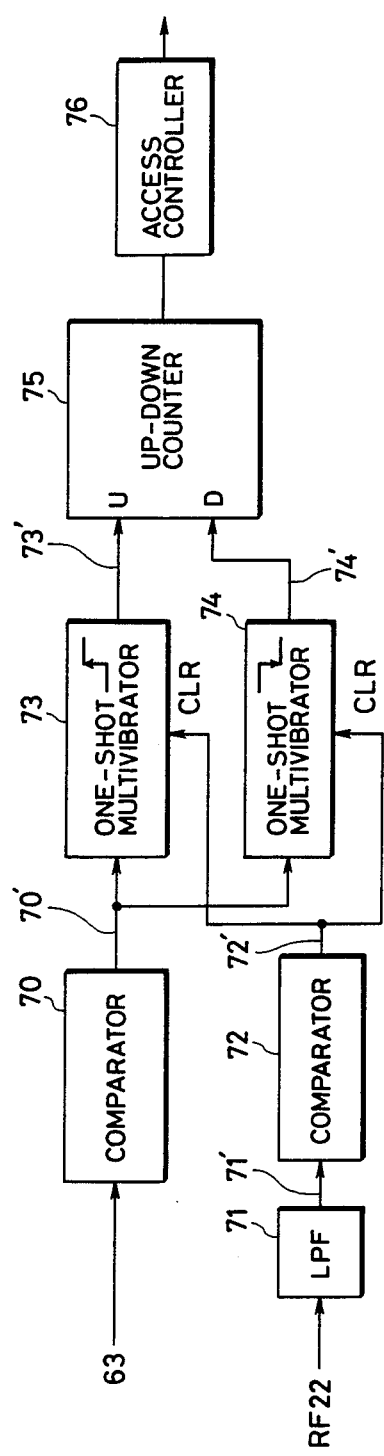
FIG. 14 shows the structure of circuits for detecting the number of the tracks a light beam has crossed by providing a groove in the information recording area.
Figure 15:
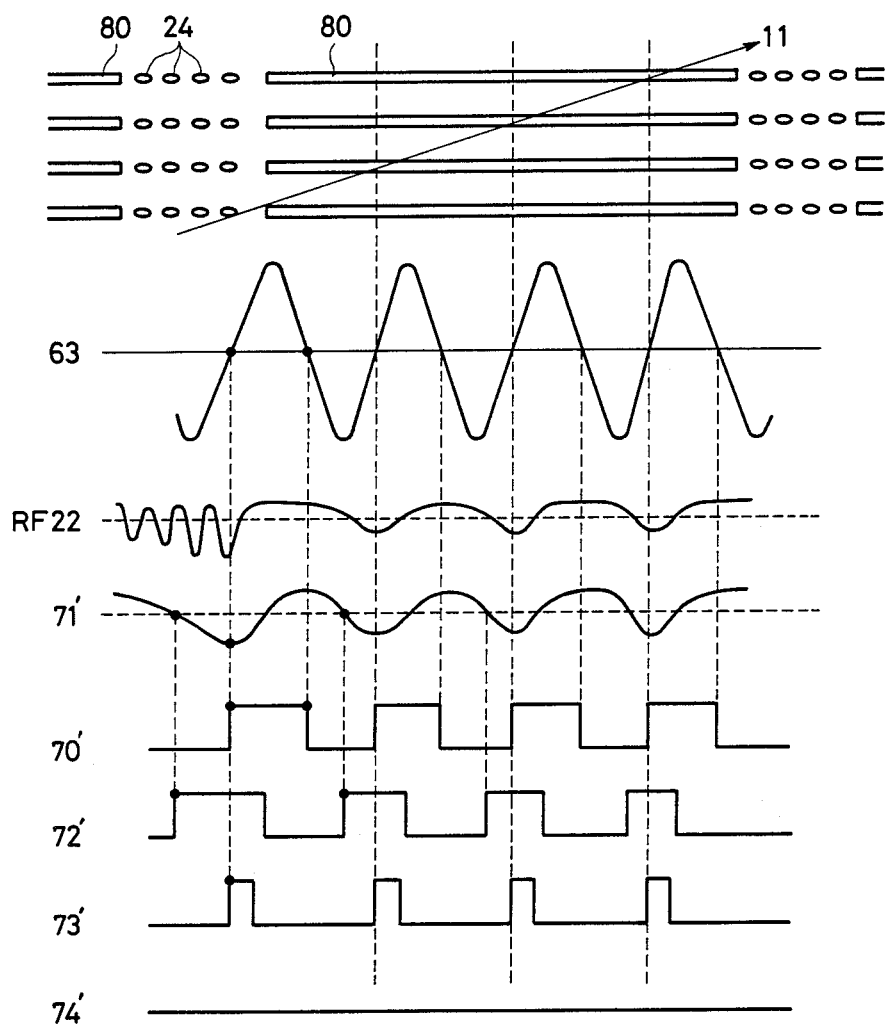
FIG. 15 shows the waveforms of the output signals.

Next, a method for random access in the invention will be described. In the track structure shown in FIG. 3, the ratio of the synchronization prepit area A to the information recording area B is approximately 1:9 ($R_s$=10%) in practical use. When nothing exists in the information recording area before recording data, a cross tracking signal is difficult to obtain when a light beam crosses the track, and therefore it is difficult to ascertain the position of the light beam, sometimes resulting in a long access time. As an example of a step for solving this problem, a track groove λ/8 deep is provided only in the information recording area B as is shown in FIG. 15, such that the position of a light beam is ascertained by counting a cross tracking signal when the light beam crosses the track groove. FIG. 14 is a block diagram showing the structure of the circuit for counting the number of tracks which a light beam crosses, and FIG. 15 explains the signal output in the circuit shown in FIG. 14 in terms of the relative relation between the positions of a light beam and those of the tracks. The cross track signal is detected by utilizing the fact that a signal 63, which is a difference signal ($I_{133}+I_{135})-(I_{134}+I_{136}$) representing the difference between the sum ($I_{133}+I_{135}$) of the output signals of the photodetectors 133, 135 and the sum ($I_{134}+I_{136}$) of the photodetectors 134, 136, becomes zero, and the fact that the output level of the RF signal becomes small as is shown in FIG. 15. To be concrete, as is shown in FIGS. 14 and 15, the signal 63 is passed through a comparator at zero crossing point so as to be converted into a binary signal 70, the rise or fall of which is detected by the one-shot multi-vibrators 73, 74, thus detecting the fact the light beam has crossed the track. At this time, in order to operate the one-shot multivibrators 73, 74 only when the light beam is in the vicinity of the center of the track, the RF signal is passed through the comparator 72 at an appropriate level such as to be converted into a binary signal and to detect the neighborhood of the center of the track after passing through the low-pass filter 71, and this signal 72' (CLR: clear reset signal) controls the inhibition or driving of the one-shot multi-vibrators 73, 74. In this way, pulses output from the one-shot multi-vibrators 73, 74 every time a light beam crosses the track groove, whether it has crossed from the inside to the outside or vice versa can be detected by seeing whether the output is 73' from the one-shot multi-vibrator 73, or 74' from the one-shot multi-vibrator 74. Therefore, by counting the number of the output pulses of both vibrators by an up down counter 75, it is possible to detect how many tracks and into which direction a light beam has crossed over a certain period, the use of which information through an access controller 76 facilitates random access.

Incidentally, in this invention, the track groove 80 and the signal 63 shown in FIG. 15 are used only for counting the number of the tracks which a light beam has crossed, not for tracking control, and tracking information is obtained from the pits 24 in the synchronization prepit area.

The above is an embodiment of an optical information recording and reproducing system according to the invention. This system is not limited to this embodiment but various modifications are possible.

Figure 16:
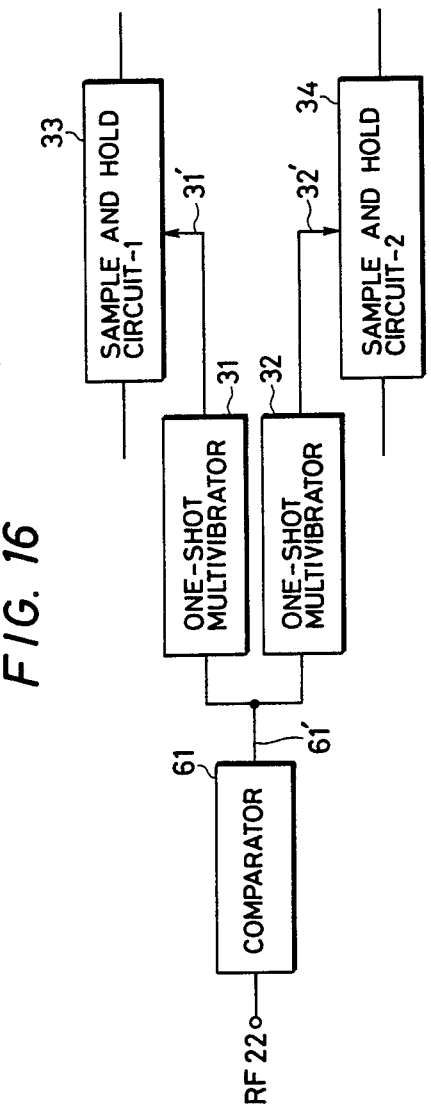
FIG. 16 shows another example of an edge detecting circuit at the time of detecting a tracking signal.

For example, in FIG. 5, the input signal to the one-shot multi-vibrators 31, 32 are obtained by inputting the DEF signal 62 into the differentiation circuit 60 and detecting the output 60' at zero crossing point by the comparator (zero crossing detector circuit), but it can also be obtained by inputting the RF signal 22 into the comparator 61, as is shown in FIG. 16. In FIG. 5, the discrimination signal 41 and the line of timing pulses 26 are obtained from the RF signal 22, but they are also obtainable from the DEF signal 62.

In the above, a change in configuration (pit structure) of the surface of a disk by a light beam (laser beam) traced at the time of recording and reproducing has been described, but this invention is not limited to this and secure tracking can also be obtained by applying this invention to a recording and reproducing system utilizing a change in magnetic characteristics of recording means the magnetic characteristics of which are changed by irradiation of a laser beam or the like. It is a matter of course that in the above embodiment, the reflected light by a light beam is used as a reproducing signal, but a transmitted light is also usable for this invention.

A track groove which is formed on a disk is not necessarily restricted to a spiral form but may also be concentric. Information may be recorded not only by a semiconductor laser but also by a combination consisting of an external modulator and a gas laser.

As is obvious from the above detailed description, an information recording and reproducing system according to the invention enables high-density recording of information onto a disk and exact readingout of the high-densely recorded information, and advances a remarkable progress in utilizing a digital disk, a digital audio disk and so forth.

What is claimed is:

1. An optical information recording and reproducing system comprising:
   a recording medium;
   at least one track on said recording medium along which a synchronization signal area and an information recording area are provided alternately, said synchronization signal area being provided with at least one pit preformed therein;
   a means for irradiating a light beam onto said recording medium;

a means for deriving a tracking signal from said light beam modulated by the at least one pit preformed in said synchronization signal area while said light beam irradiates said synchronization signal area;

a means for holding said tracking signal to enable tracking when said light beam irradiates said information recording area;

a means for tracking by using said tracking signal from said holding means to control positioning of said light beam at least when said light beam irradiates said information recording area;

a means for recording an information signal in said information recording area by modulating said light beam irradiating said information recording area with an information signal; and a means for compensation connected between said holding means and said tracking means for compensating an electrical phase delay caused by holding said tracking signal so as to enable accurate tracking when said light beam irradiates said information recording area.

2. An information recording and reproducing system according to claim 1, wherein a line of pits are preformed in said synchronization signal area.

3. An information recording and reproducing system according to claim 1, wherein said means for compensation include a phase lead compensator.

4. An information recording and reproducing system according to claim 2, wherein said means for compensation include a phase lead compensator.

5. An information recording and reproducing system according to claim 1, further comprising means for generating timing pulses for recording said information signal in response to said light beam which has been modulated by the at least one pit in said synchronization signal area.

6. An information recording and reproducing system according to claim 2, further comprising means for generating timing pulses for recording said information signal in response to said light beam which has been modulated by said line of pits in said synchronization signal area.

7. An optical information recording and reproducing system comprising:

a reproducing medium;

tracks on said recording medium along which a synchronization signal area and an information recording area are provided alternately, said synchronization signal area being provided with at least one pit preformed thereon;

a means for irradiating a light beam onto said recording medium;

a means for deriving a tracking signal from said light beam modulated by the at least one pit preformed in said synchronization signal area while said light beam irradiates said synchronization signal area;

a means for holding said tracking signal to enable tracking when said light beam irradiates said information recording area;

a means for tracking by using said tracking signal from said holding means to control positioning of said light at least when said light beam irradiates said information recording area;

a means for recording an information signal in said information recording area by modulating said light beam irradiating said information area with an information signal;

a means for compensation connected between said holding means and said tracking means for compensating an electrical phase delay caused by holding said tracking signal so as to enable accurate tracking when said light beam irradiates said information recording area; and track grooves for access which are provided in said information recording area such that access to a desired track is enabled at the time of random access.

8. An information recording and reproducing system according to claim 7, wherein said means for compensation includes a phase lead compensator.

9. An information recording and reproducing system according to claim 8, further comprising means for generating timing pulses for recording said information signal in response to said light beam which has been modulated by the at least one pit in said synchronization signal area.

* * * * *